United States Patent
Theios (10) Patent No.: US 10,871,600 B2
(45) Date of Patent: Dec. 22, 2020

(54) WINDOW FOR REDUCING BIRD COLLISIONS

(71) Applicant: Guardian Glass, LLC, Auburn Hills, MI (US)

(72) Inventor: Jason E. Theios, Toledo, OH (US)

(73) Assignee: Guardian Glass, LLC, Auburn Hills, MI (US)

(*) Notice: Subject to any disclaimer, the term of this patent is extended or adjusted under 35 U.S.C. 154(b) by 1468 days.

(21) Appl. No.: 13/716,320

(22) Filed: Dec. 17, 2012

(65) Prior Publication Data

US 2014/0168760 A1 Jun. 19, 2014

(51) Int. Cl.
| | |
|---|---|
| G02B 5/20 | (2006.01) |
| C03C 17/36 | (2006.01) |
| A01M 29/08 | (2011.01) |
| E06B 3/66 | (2006.01) |

(52) U.S. Cl.
CPC .............. *G02B 5/208* (2013.01); *A01M 29/08* (2013.01); *C03C 17/366* (2013.01); *C03C 17/3626* (2013.01); *C03C 17/3639* (2013.01); *C03C 17/3644* (2013.01); *C03C 17/3652* (2013.01); *C03C 17/3657* (2013.01); *C03C 17/3681* (2013.01); *C03C 2217/74* (2013.01); *E06B 3/66* (2013.01)

(58) Field of Classification Search
CPC .......... G02B 5/20; G02B 5/202; G02B 5/204; G02B 5/205; G02B 5/206; G02B 5/207; G02B 5/208; G02B 5/22; G02B 5/223; G02B 5/226
USPC ................................................ 359/350–361
See application file for complete search history.

(56) References Cited

U.S. PATENT DOCUMENTS

| | | | |
|---|---|---|---|
| 3,682,528 | A | 8/1972 | Apfel et al. |
| 4,898,790 | A | 2/1990 | Finley |
| 4,965,121 | A | 10/1990 | Young et al. |
| 5,156,894 | A | 10/1992 | Hood et al. |

(Continued)

FOREIGN PATENT DOCUMENTS

| | | |
|---|---|---|
| EP | 2 514 724 | 10/2012 |
| WO | WO 2012/020189 | 2/2012 |
| WO | 2014099476 A1 | 6/2014 |

OTHER PUBLICATIONS

High reflectivity of Silver extended down to 200nm, N. Thomas et. al., optical society of america's eightn tompical meeting on optical interference coatings, Jun. 4, 2001.*

(Continued)

*Primary Examiner* — Robert E. Tallman (57) ABSTRACT

A window is designed to prevent or reduce bird collisions therewith. In certain example embodiments, the window may be an insulating glass (IG) window unit, or alternatively a monolithic window. In IG window unit embodiments, the IG window unit includes first and second substrates (e.g., glass substrates) spaced apart from one another, wherein at least one of the substrates supports both a patterned ultraviolet (UV) absorbing coating for absorbing UV radiation, and a UV reflecting coating for reflecting UV radiation, so that a more contrasting UV image is emitted/seen and birds are capable of more easily seeing the window and avoiding collisions therewith. By making the window more visible to birds, bird collisions therewith and bird deaths can be reduced.

23 Claims, 6 Drawing Sheets

(56) References Cited

U.S. PATENT DOCUMENTS

| | | | |
|---|---|---|---|
| 5,306,547 A | 4/1994 | Hood et al. | |
| 5,308,662 A | 5/1994 | Woodard et al. | |
| 5,514,476 A | 5/1996 | Hartig et al. | |
| 5,557,462 A | 9/1996 | Hartig et al. | |
| 5,563,734 A | 10/1996 | Wolfe et al. | |
| 5,784,853 A | 7/1998 | Hood et al. | |
| 5,800,933 A | 9/1998 | Hartig et al. | |
| 5,837,108 A | 11/1998 | Lingle et al. | |
| 5,902,505 A | 5/1999 | Finley | |
| 5,935,702 A | 8/1999 | Macquart et al. | |
| 6,014,872 A | 1/2000 | Hartig et al. | |
| 6,030,671 A | 2/2000 | Yang et al. | |
| 6,576,349 B2 | 6/2003 | Lingle et al. | |
| 6,632,491 B1 * | 10/2003 | Thomsen et al. | 428/34 |
| 7,153,579 B2 | 12/2006 | Kriltz et al. | |
| 7,217,461 B2 | 5/2007 | Ferreira et al. | |
| 7,267,879 B2 | 9/2007 | Thomsen et al. | |
| 7,858,191 B2 | 12/2010 | Lemmer et al. | |
| 7,879,448 B2 | 2/2011 | Dietrich et al. | |
| 7,897,260 B2 | 3/2011 | Nunez-Regueiro et al. | |
| 7,964,284 B2 | 6/2011 | Blacker et al. | |
| 7,998,320 B2 | 8/2011 | Laird et al. | |
| 8,017,243 B2 | 9/2011 | Blacker et al. | |
| 8,025,941 B2 * | 9/2011 | Taylor | C03C 17/007 428/34 |
| 8,101,278 B2 | 1/2012 | Laird | |
| 8,114,488 B2 | 2/2012 | Alvarez | |
| 8,124,237 B2 | 2/2012 | Nunez-Regueiro et al. | |
| 8,142,622 B2 | 3/2012 | Ferreira et al. | |
| 8,173,263 B2 | 5/2012 | Lingle et al. | |
| 8,557,391 B2 | 10/2013 | Frank et al. | |
| 2008/0070044 A1 | 3/2008 | Blacker et al. | |
| 2009/0047487 A1 * | 2/2009 | Klem, Jr. | A01M 29/06 428/210 |
| 2009/0130349 A1 * | 5/2009 | Alvarez | C03C 17/36 428/34 |
| 2010/0297413 A1 * | 11/2010 | Hartig | 428/213 |
| 2012/0207952 A1 | 8/2012 | Walp | |
| 2012/0219821 A1 | 8/2012 | Frank et al. | |
| 2013/0087720 A1 * | 4/2013 | Cesnik et al. | 250/461.1 |

OTHER PUBLICATIONS

Axelevitch et. al., "Investigation of optical transmission in thin metal films" 2012, Physics procedia, 32, 1-13 (Year: 2012).*
"Bird Friendly Glass", Tech Talk; VIRACON "The Leader in Glass Fabrication" 2011; VR0811; 4pgs.

* cited by examiner

WINDOW FOR REDUCING BIRD COLLISIONS

This invention relates to a window designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports both (i) a patterned ultraviolet (UV) absorbing coating for absorbing UV radiation, and (ii) a UV reflecting coating for reflecting UV radiation, so that a more contrasting UV image is emitted and birds are capable of more easily seeing the window and avoiding collisions therewith. In certain example embodiments, the UV absorbing coating is provided in a pattern and located between the substrate and the UV reflecting coating, with the UV reflecting coating being substantially continuous across substantially all of a major surface of the substrate. In certain example embodiments, the UV reflecting coating may be, or include, a low-emissivity (low-E) coating. By making the window more visible to birds, bird collisions therewith and bird deaths can be reduced.

BACKGROUND OF THE INVENTION

IG window units are known in the art. For example, see U.S. Pat. Nos. 6,632,491; 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

Unfortunately, bird collisions with such windows represent a significant problem. For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration.

Birds often impact facades for various reasons including the inability to distinguish the glass from empty space. Conventional ways of reducing bird collisions with windows include the use of nets and decals. However, these solutions are considered ineffective because of the aesthetic impact on the architecture and/or they are too visible to humans.

U.S. Pat. No. 8,114,488 discloses a window for preventing bird collisions. However, while the window of the '488 patent is effective for preventing/reducing bird collisions, there is room for improvement.

In view of the above, it will be appreciated that there exists a need in the art for improved windows which can prevent or reduce bird collisions therewith.

BRIEF SUMMARY OF THE INVENTION

In certain example embodiments of this invention, a window is designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports both (i) a patterned ultraviolet (UV) absorbing coating for absorbing UV radiation, and (ii) a UV reflecting coating for reflecting UV radiation, so that a more contrasting UV image is emitted and birds are capable of more easily seeing the window and avoiding collisions therewith. In certain example embodiments, the UV absorbing coating is provided in a pattern and located between the substrate and the UV reflecting coating, with the UV reflecting coating being substantially continuous across substantially all of a major surface of the substrate. By making the window more visible to birds, bird collisions therewith and bird deaths can be reduced.

In certain example embodiments, the UV reflecting coating may be, or include, a low-emissivity (low-E) coating. In certain other example embodiments, the UV reflecting coating may comprise or consists essentially of an oxide and/or nitride of one or more of titanium, vanadium, chromium, zirconium, niobium, tantalum, and tungsten. In certain example embodiments, in areas where the UV absorbing coating is not provided, the window has a visible transmission of at least about 50%, more preferably at least about 55%, and most preferably at least about 60%. In certain example embodiments, the UV reflecting coating reflects at least about 5% more, more preferably at least about 10% more, and most preferably at least about 15% more UV radiation in at least some area(s) within the range of from 350-380 nm than does the UV absorbing coating. In certain example embodiments, the UV reflecting coating reflects at least 20%, more preferably at least 30%, and most preferably at least 35% of UV radiation in at least some area(s) within the range of from 360-390 nm, whereas the UV absorbing coating absorbs substantial amounts of UV radiation within this range but does not reflect as much UV radiation as does the UV reflecting coating within this range of the spectrum.

In certain example embodiments of this invention, there is provided a window unit (e.g., IG window unit or monolithic window unit) comprising: a glass substrate; an ultraviolet (UV) absorbing coating provided in a pattern and located on the glass substrate; a UV reflecting coating located on the glass substrate, so that the UV absorbing coating is to be located closer to an exterior of a building in which the window is to be installed than is the UV reflecting coating, wherein the UV reflecting coating is substantially transparent to visible light and reflects at least 20% of UV radiation in a majority of a range of from 360-390 nm.

In certain example embodiments of this invention, there is provided an IG window unit comprising: a first glass substrate; a second glass substrate spaced apart from the first glass substrate, wherein the first glass substrate is adapted to be located farther from a building interior than is the second glass substrate; an ultraviolet (UV) absorbing coating provided in a pattern and located on an interior surface of the first glass substrate so that the UV absorbing coating is located between at least the first and second glass substrates; a UV reflecting coating located on the interior surface of the first glass substrate, so that the UV absorbing coating is located between at least the first glass substrate and the UV reflecting coating, wherein the UV reflecting coating reflects at least about 5% more UV radiation than does the UV absorbing coating in at least a majority of a range of from 360-390 nm.

DETAILED DESCRIPTION OF EXAMPLE EMBODIMENTS OF THE INVENTION

Referring now more particularly to the accompanying drawings in which like reference numerals indicate like parts throughout the several views.

In certain example embodiments of this invention, referring to FIGS. 1-7 for example, a window 10 is designed to prevent or reduce bird collisions therewith. In certain example embodiments, the window 10 may comprise an insulating glass (IG) window unit, or alternatively a monolithic window. In IG window unit embodiments, the IG window unit includes first and second substrates (e.g., glass substrates) 1 and 3 spaced apart from one another, wherein at least one of the substrates (e.g., 1) supports both (i) a patterned UV absorbing coating 2 for absorbing UV radiation, and (ii) a UV reflecting coating 5 for reflecting UV radiation, so that a more contrasting UV image is emitted and birds are capable of more easily seeing the window 10 and avoiding collisions therewith. In certain example embodiments, the UV absorbing coating 2 is provided in a pattern (e.g., a criss-cross and/or grid pattern best shown in FIGS. 3 and 5, a striped pattern, a dotted pattern, a pattern of triangles, a checkered pattern, a random pattern, etc.) and is located between the substrate 1 and the UV reflecting coating 5, with the UV reflecting coating 5 being substantially continuous across substantially all of a major surface of the substrate 1. By making the window more visible to birds, bird collisions therewith and bird deaths can be reduced.

Research has indicated that birds can see in the near UV range, whereas humans typically cannot. The UV absorbing pattern 2 (e.g., gray and/or black fit material) may be applied to any surface of a monolithic window or IG window unit, and a UV reflective coating 5 may be applied on the inside surface of the UV absorbing coating 2 so that the UV absorbing coating 2 is located between the window exterior/sun and the UV reflecting coating 5, possibly so that the two coatings directly contact each other. Locating the UV absorbing coating 2 between the sun and the UV reflecting coating 5 produces a more contrasting UV image that enables birds to more easily see the window and prevent or reduce bird collisions with the window 10. In certain example embodiments, UV reflecting coating 5 is substantially transparent to visible light (e.g., transmissive of at least about 40% of visible light, more preferably transmissive of at least about 50% of visible light, and most preferably transmissive of at least about 60% of visible light), and is substantially transparent to humans but not to birds because of significant UV reflections. Unlike humans, birds are capable of seeing into the UV range. To help birds further recognize and see a window including UV reflecting coating 5, a pattern of UV absorbing material 2 is located in front (on the sun side) of the UV reflecting coating 5 to create a pattern that birds can even more easily recognize. The pattern, which contrasts between (i) UV reflection off of coating 5 in areas T where the UV absorbing material 2 is not present, and (ii) UV absorption in areas where pattern 2 of UV absorbing material is present, is more easily seen by birds and further deters birds from flying into facades/windows. Moreover, in certain example embodiments, if both the non-continuous UV absorbing pattern 2 (e.g., applied via silk-screen) and UV reflective coating 5 (e.g., applied via sputtering) are applied without heating the underlying glass substrate 1 to over 350 degrees C., the coated article including the substrate 1 and the coatings can be cut to desired size(s).

Figure 2:
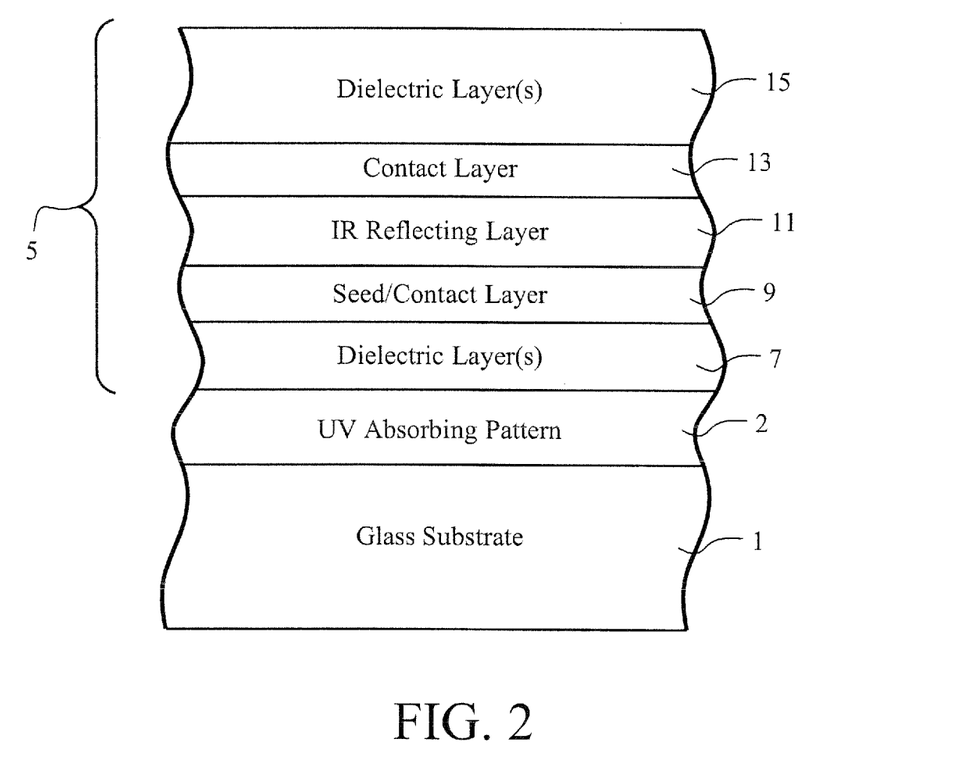
FIG. 2 is a cross sectional view of a coated article, including a UV absorbing pattern and a UV reflecting coating (e.g., low-E coating), that may be used in the IG window unit of any of FIGS. 1, 4 and/or 5.
Figure 6:
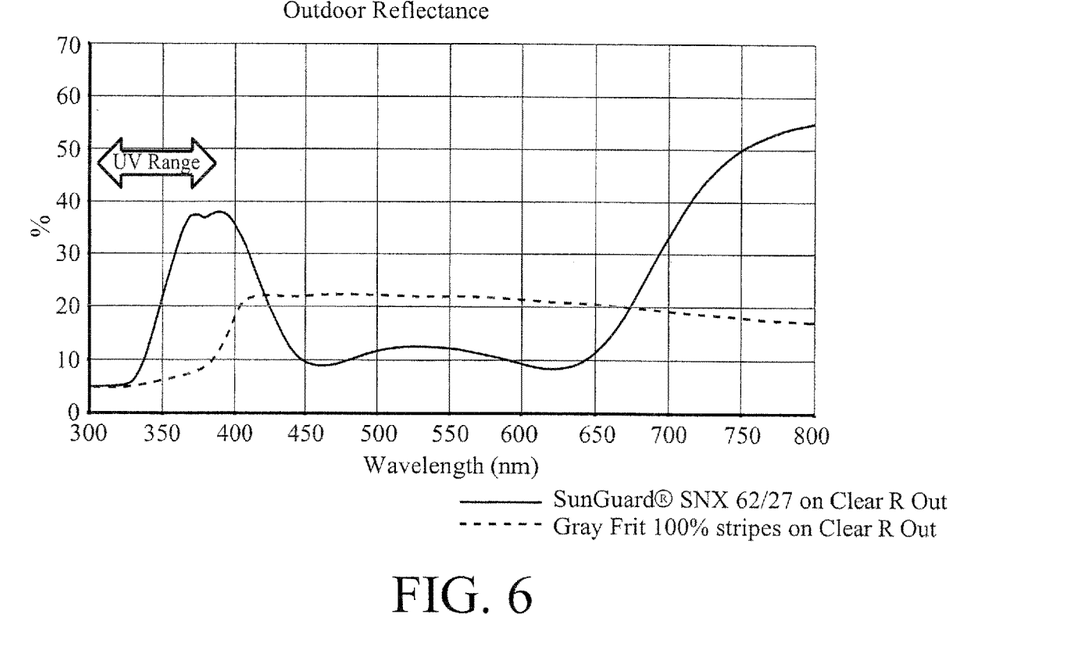
FIG. 6 is a percent (%) outside (glass side) reflectance vs. wavelength illustrating characteristics of an example UV absorbing coating (dotted line) compared to an example UV reflecting coating (solid line) according to an example embodiment of this invention, where such coatings may be used in connection with any of FIG. 1-5 or 7.
Figure 7:
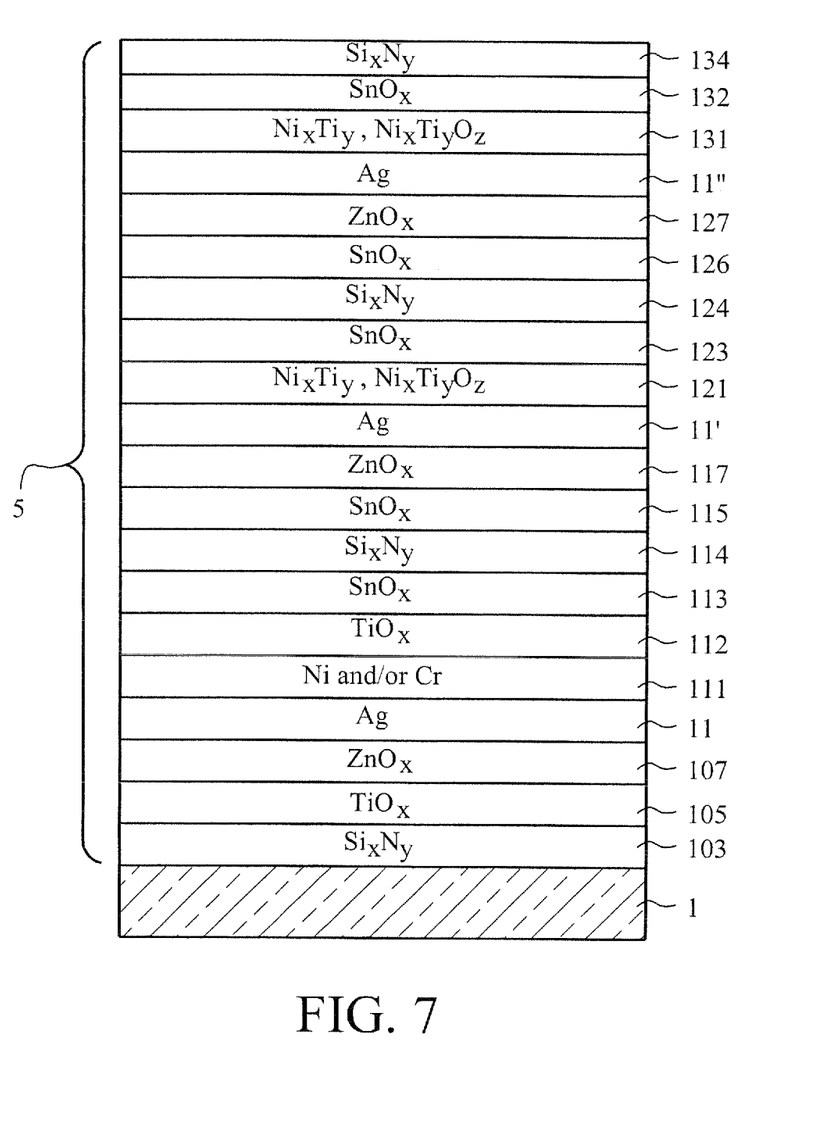
FIG. 7 is a cross sectional view of a coated article, including a UV absorbing pattern and another example UV reflecting coating (e.g., low-F coating), that may be used in the IG window unit of any of FIGS. 1, 4 and/or 5.

In certain example embodiments, the UV reflecting coating 5 may be, or include, a low-emissivity (low-E) coating (e.g., examples best illustrated in FIGS. 2 and 7). In such embodiments, the low-E coating 5 may also block IR via IR reflecting layer(s) 11 and the coating may have an emissivity ($E_n$) of no greater than 0.10 and/or a sheet resistance ($R_s$) of no greater than 10 ohms/square, more preferably no greater than 8 or 6 ohms/square. In certain other example embodiments, the UV reflecting coating 5 may comprise or consists essentially of an oxide and/or nitride of one or more of titanium, vanadium, chromium, zirconium, niobium, tantalum, and tungsten. The use of coating 5 enhances the performance of the glass or window by increasing the UV reflectance beyond the normal limits of raw uncoated plate glass in at least the 350-380 nm range of the spectrum. Typical raw float glass reflects about 5% of UV light in the 350-440 nm range. In contrast, the solid line in FIG. 6 shows that an example UV coating 5 reflects significantly more UV in that range. Note that UV reflecting coating 5, as shown by the solid line in FIG. 6, has a glass side (outside) reflectance hump in the UV range compared to the visible range (e.g., 440-680 nm) of the spectrum indicating that the coating 5 has much more glass side reflectance in the UV range of the spectrum than in the visible range of the spectrum.

In certain example embodiments, in at least areas (e.g., see areas T in FIGS. 3-4) where the UV absorbing coating 2 is not provided, the window has a visible transmission of at least about 50%, more preferably at least about 55%, and most preferably at least about 60%. In certain example embodiments, the UV reflecting coating 5 reflects at least about 5% more, more preferably at least about 10% more, and most preferably at least about 15% more UV radiation in at least some area(s) within the range of from 360-390 nm than does the UV absorbing coating 2. In certain example embodiments, the UV reflecting coating 5 reflects at least 20%, more preferably at least 30%, and most preferably at least 35% of UV radiation in at least some area(s) (possibly in at least a substantial part of the area) within the range of from 360-390 nm, whereas the UV absorbing coating 2 absorbs substantial amounts of UV radiation within this range but does not reflect as much UV radiation as does the UV reflecting coating 5 within this range of the spectrum. In certain example embodiments, the UV absorbing coating 2 reflects no more than about 30%, more preferably no more than about 25%, even more preferably no more than about 20%, 15%, or 10%, of UV in a substantial part of the range from 350-380 nm. In certain example embodiments, the UV absorbing pattern 2 may or may not be substantially transparent to visible light, and when the UV absorbing pattern 2 (e.g., gray frit material) is substantially transparent to visible light then the pattern 2 is not easily seen by humans and is aesthetically pleasing.

Figure 1:
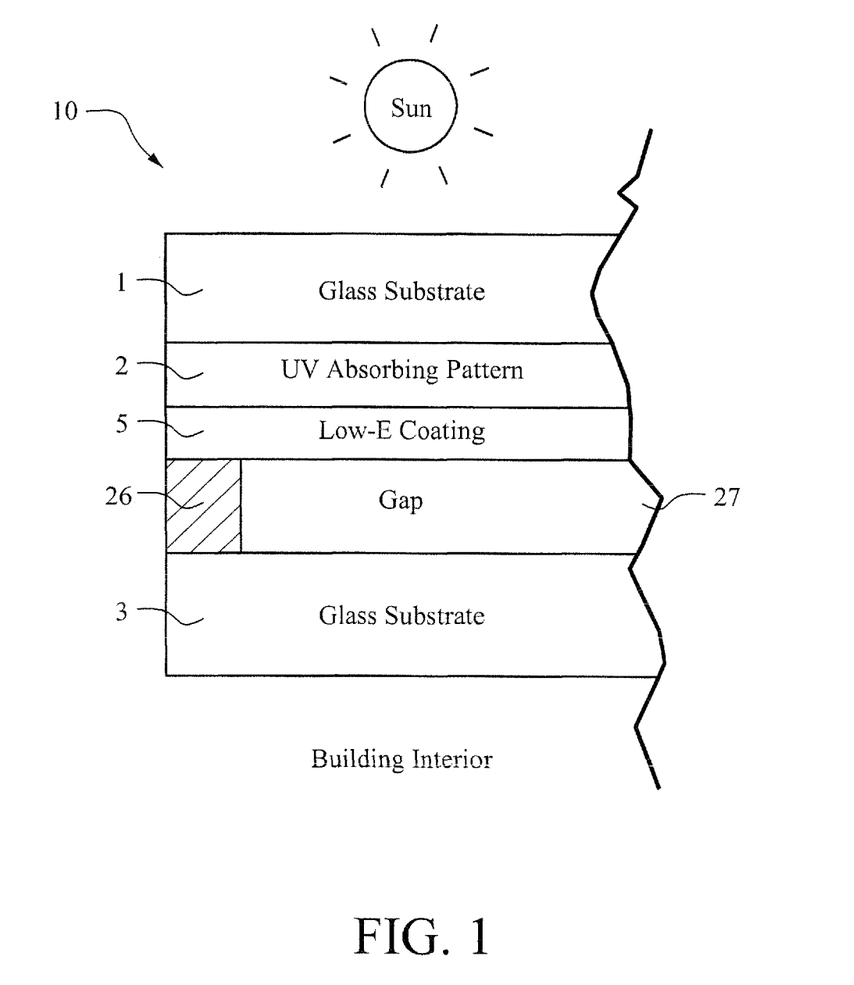
FIG. 1 is a cross sectional view of an IG window unit according to an example embodiment of this invention.
Figure 5:
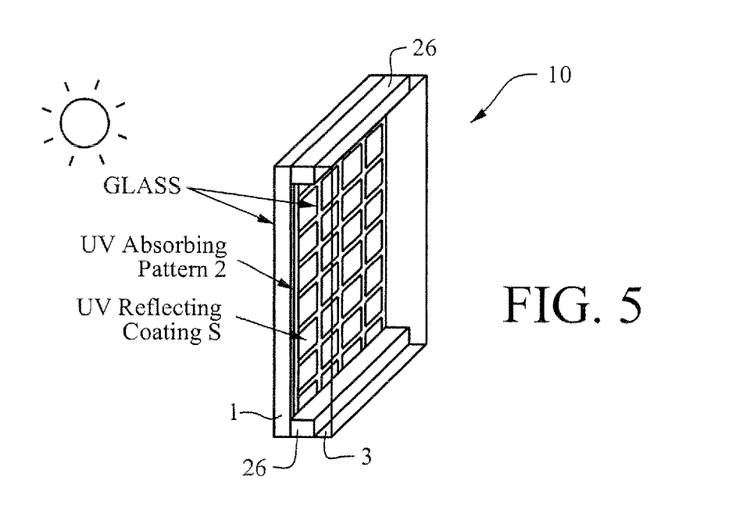
FIG. 5 is a perspective view of an IG window unit (e.g., of the window unit of FIGS. 1 and/or 4) according to an example embodiment of this invention.

FIG. 1 is a cross sectional view of a portion of an IG window unit 10 according to an example embodiment of this invention, and FIG. 5 is a perspective view of a portion of the IG window unit 10. As shown in FIGS. 1 and 5, the IG window unit includes first transparent glass substrate 1 and second transparent glass substrate 3 that are spaced apart from one another at least by one or more peripheral seal(s) or spacer(s) 26. Optionally, an array of pillars/spacers (not shown) may be provided between the substrates in a viewing area of the window for spacing the substrates from one another as in the context of a vacuum IG window unit. The spacer(s) 26, other spacer(s), and/or peripheral seal space the two substrates 1 and 3 apart from one another so that the substrates do not contact one another and so that a space or gap 27 is defined therebetween. The space 27 between the substrates 1, 3 may be evacuated to a pressure lower than atmospheric in certain example embodiments, and/or may be filled with a gas (e.g., Ar) in certain example embodiments. Alternatively, space 27 between the substrates 1, 3 need not be filled with a gas and/or need not be evacuated to a low pressure. When substrate(s) 1 and/or 3 are of glass, each glass substrate may be of the soda-lime-silica type of glass, or any other suitable type of glass, and may be for example from about 1 to 10 mm thick in certain example embodiments of this invention. In the FIG. 1, 5 embodiment, the outer glass substrate 1 (i.e., the substrate closer to the sun and farthest from the building interior) supports UV absorbing coating/pattern 2 and UV reflecting coating 5, with the UV absorbing coating/pattern being positioned between and possibly directly contacting the glass substrate 1 and the UV reflecting coating 5. UV absorbing pattern 2 may be of or include frit such as gray frit and/or black frit, and may be substantially transparent to visible light (e.g., gray frit) so that the UV image pattern formed in the window is not easily seen by humans.

Example UV reflecting coatings (e.g., low-E coatings) 5 which may be provided on substrate 1 in any embodiment herein are described in U.S. Pat. Nos. 8,173,263, 8,142,622, 8,124,237, 8,101,278, 8,017,243, 7,998,320, 7,964,284, 7,897,260, 7,879,448, 7,858,191, 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, and U.S. Ser. No. 13/064,066, all of which are hereby incorporated herein by reference. In the context of low-E coatings 5, in addition to reflecting certain amounts of UV radiation, the coatings also block certain amounts of IR radiation from reaching the building interior due to one, two, or three IR reflecting layers (e.g., silver based layers) in the coating 5. Locating the UV absorbing coating 2 between the sun and the UV reflecting coating 5 produces a more contrasting UV image (compared to use of only coating 2, or only coating 5) that enables birds to more easily see the window and prevent or reduce bird collisions with the window 10. Thus, to help birds further recognize and see the window including a UV reflecting coating 5, the pattern of UV absorbing material 2 is located in front (on the sun side) of the UV reflecting coating 5 to create a pattern that birds can even more easily recognize. Alternatively, the UV reflecting coating 5 in any embodiment herein need not be a low-E coating and instead could be a single layer of or including titanium oxide (e.g., $TiO_2$) which may be deposited on substrate 1 via sputtering or the like, or a single layer of or including vanadium oxide which may be deposited on substrate 1 via sputtering or the like.

As shown in FIGS. 1 and 5, IG units typically are characterized as having four surfaces. In particular, surface #1 faces the building exterior (i.e., faces the sun in FIGS. 1 and 5), surface #2 is the interior surface of the same substrate 1 but faces the interior space/gap 27 of the IG unit, surface #3 is the interior coated/uncoated surface of the other substrate 3 facing the interior space/gap 27, and surface #4 faces the building interior. In the FIG. 1, 5 embodiment, the UV absorbing pattern 2 and the UV reflecting coating 5 are both located on surface #2, i.e., both coatings 2 and 5 are located on the interior surface of outer glass substrate 1. This is a preferred arrangement of the coatings, as it enables much IR radiation to be blocked and much UV to be reflected by coating 5 before reaching space 27 when a low-E coating is used as the coating 5. However, in alternative embodiments of this invention, the coatings 2 and 5 may be located on surface #3 so as to be located on the face of the other substrate 3 facing gap 27 such that the low-E coating 5 is located between the substrate 3 and the UV absorbing pattern 2.

It is noted that "on" as used herein covers both directly and indirectly on. For instance, in FIG. 1 coating 5 is "on" and supported by glass substrate 1 even though coating 2 is located therebetween.

Figure 4:
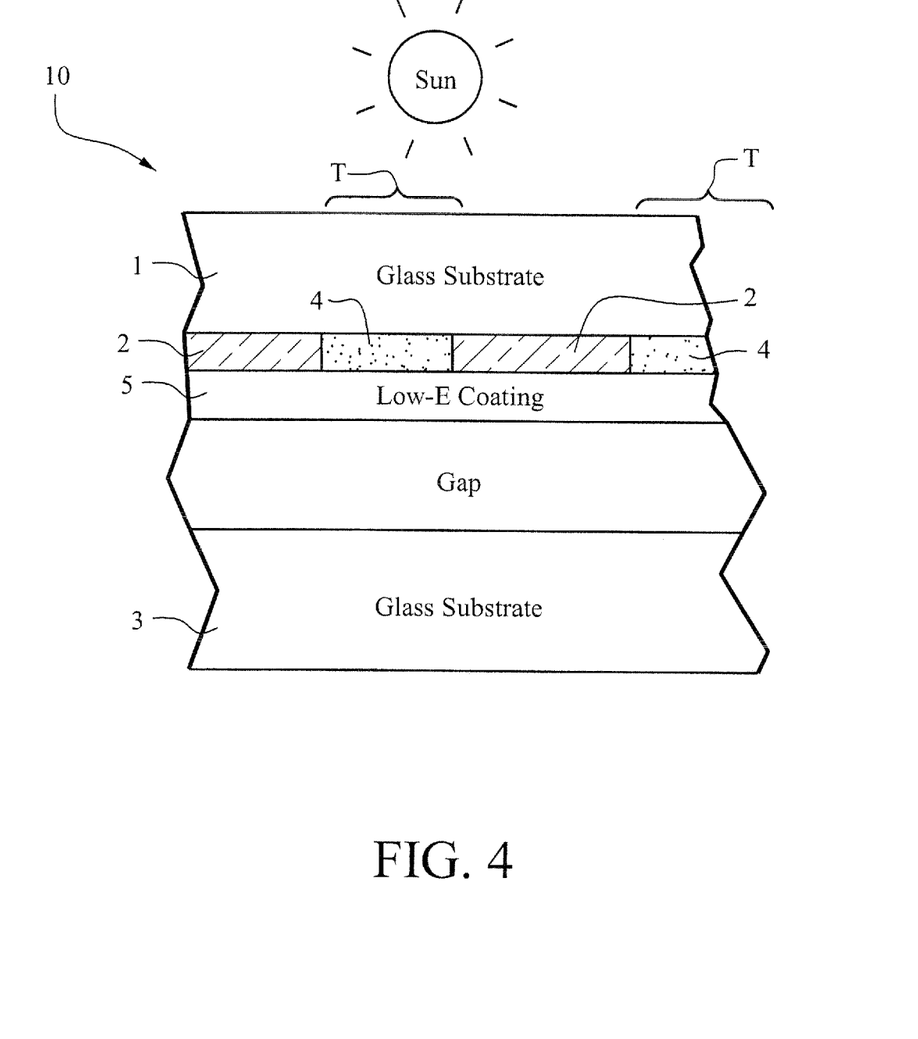
FIG. 4 is a cross sectional view of an IG window unit (e.g., a portion of the window unit of FIG. 1 and/or FIG. 5), taken along section line 4-4 in FIG. 3, according to an example embodiment of this invention.

FIG. 2 is a cross sectional view of a coated article, including a UV absorbing pattern 2 and a UV reflecting coating (e.g., low-E coating) 5, that may be used in the IG window unit of any of FIGS. 1, 4 and/or 5. A single silver type low-F coating is illustrated in FIG. 2, for purposes of example. A low-E coating typically includes at least one IR reflecting layer of or including silver 11 sandwiched between at least a lower dielectric 7 and an upper dielectric 15. The example low-E coating 5 in FIG. 2 which also functions as a UV reflecting coating may include, for example, a lower dielectric layer(s) 7 of or including titanium oxide or silicon nitride, a lower contact/seed layer 9 of or including zinc oxide (e.g., ZnO), zinc aluminum oxide, zinc stannate (e.g., ZnSnO), tin oxide, and/or combinations thereof, IR reflecting layer 11 of or including silver or gold, upper contact layer 13 of or including Ni and/or Cr (e.g., NiCr, $NiCrO_x$, $NiO_x$, or the like) that is located over and directly contacting the silver based layer 11, and upper dielectric layer(s) 15 of or including silicon nitride and/or tin oxide. The metal oxide based contact/seed layer 9 may optionally be doped with material such as Al, Ni or Ti. In certain example embodiments, dielectric layer 15 may be made up of a lower layer of or including tin oxide and an upper layer of or including silicon nitride and/or silicon oxynitride. Optionally, an overcoat of or including zirconium oxide may be provided over dielectric layer 15. The layers of the thin film coating 5 may be deposited in any suitable manner, such as at approximately room temperature via sputtering. While the low-E coating 5 illustrated in FIG. 2 has only one IR reflecting layer 11 of or including silver, it will be appreciated that other low-E coatings that may be used for UV reflecting coating 5 may include multiple silver based IR reflecting layers as illustrated and/or described in some of the patent documents identified above.

Figure 3:
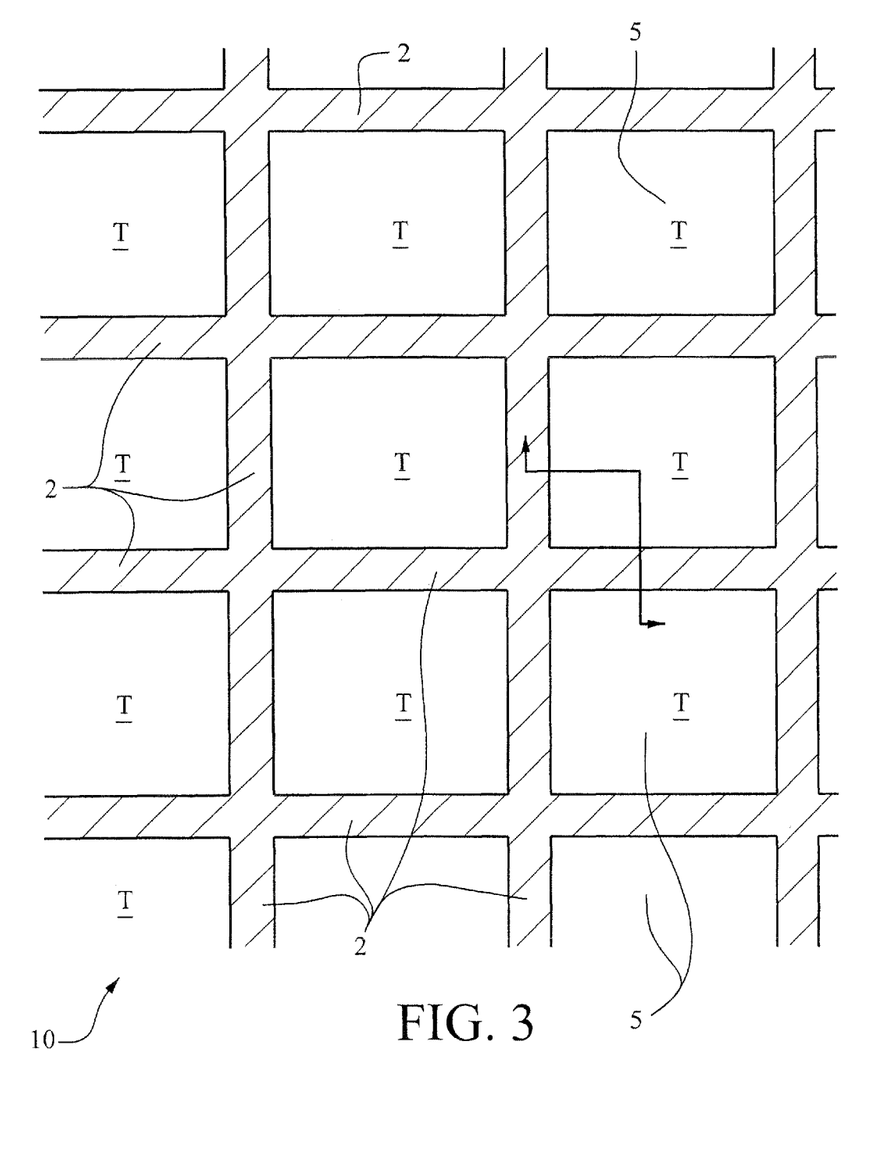
FIG. 3 is a top plan view illustrating a portion of the IG window unit of FIGS. 1 and/or 4-5, and/or the coated article of FIGS. 2 and/or 7.

FIG. 3 is a top plan view illustrating a portion of the IG window unit of FIGS. 1 and/or 4-5, and/or the coated article of FIGS. 2 and/or 7. The criss-cross pattern shown in FIG. 3 is due to the criss-cross pattern of UV absorbing material/coating 2 on the substrate 1. The cross-sectional areas in FIG. 3 represent areas where both the UV absorbing material/coating 2 and the UV reflecting coating 5 are located (however, the UV absorbing material/coating 2 in these areas absorbs much of the UV before it can reach coating 5), whereas the areas "T" in FIG. 3 represent areas where the UV reflecting coating 5 (but not the UV absorbing material 2) is present on the substrate 1. The pattern 2, which contrasts between (i) UV reflection off of coating 5 in areas T where the UV absorbing material 2 is not present, and (ii) UV absorption in areas where pattern 2 of UV absorbing material is present, is more easily seen by birds and further deters birds from flying into facades/windows.

FIG. 4 is a cross sectional view of an IG window unit (e.g., a portion of the window unit of FIG. 1 and/or FIG. 5), taken along section line 4-4 in FIG. 3. In FIGS. 3-4, it can be seen that UV absorbing material 2 is provided discontinuously, on only part of the substrate 1. In contrast, UV reflecting coating 5 is provided across substantially the entire viewing area of the window on substrate 1. Optional dielectric substantially transparent filler material 4 may optionally be provided in the gaps in the absorbing pattern 2, so that the UV reflecting coating 5 can lie over the same in a more flat manner. However, in certain example embodiments, filler material 4 need not be present and in certain example embodiments, the UV reflecting coating 5 may be substantially conformal to the absorbing pattern 2.

FIG. 6 is a percent (%) outside (glass side) reflectance vs. wavelength illustrating characteristics of an example UV absorbing coating (dotted line) compared to an example UV reflecting coating (solid line) according to an example embodiment of this invention, where such coatings may be used in connection with any of FIGS. 1-5 and/or 7. The UV reflecting coating 5 plotted as the solid line in FIG. 6 is the low-E coating with three silver based IR reflecting layers 11, 11' and 11" from FIG. 7, whereas the UV absorbing coating/pattern 2 plotted as the dotted line in FIG. 6 is gray frit. The reflectance plots in FIG. 6 are provided for purposes of example and are not intended to be limiting. However, it can be seen that the UV reflecting coating 5 (solid line in FIG. 6) reflects at least about 5% more, more preferably at least about 10% more, and most preferably at least about 15% more UV radiation in at least some area(s) within the range of from 350-380 nm than does the UV absorbing coating/pattern 2 (dotted line in FIG. 6). In certain example embodiments, the UV reflecting coating 5 reflects at least 20%, more preferably at least 30%, and most preferably at least 35% of UV radiation in at least some area(s) (possibly in at least a substantial part of the area) within the range of from 350-380 nm, whereas the UV absorbing coating 2 absorbs substantial amounts of UV radiation within this range but does not reflect as much UV radiation as does the UV reflecting coating 5 within this range of the spectrum. In certain example embodiments, as shown in FIG. 6, the UV absorbing coating/pattern 2 reflects no more than about 30%, more preferably no more than about 25%, even more preferably no more than about 20%, 15%, or 10%, of UV in a substantial part of the range from 350-380 nm.

FIG. 7 is a cross sectional view of a coated article, including another example UV reflecting coating (e.g., low-E coating) 5 on a glass substrate 1, that may be used in the IG window unit of any of FIGS. 1, 3, 4 and/or 5 (note that the UV absorbing coating 2 is not shown in FIG. 7 for purposes of simplicity, but is preferably located between the substrate 1 and low-E coating 5). The UV reflecting coating 5 in FIG. 7 has three silver based IR reflecting layers 11, 11' and 11", and thus may have increased UV reflection because these layers also reflect UV as will be appreciated by FIG. 6. The coating 5 in FIG. 7 is described in U.S. Ser. No. 13/064,066, which is incorporated hereby by reference in its entirety, and any triple silver low-E coating described in the '066 application may be used as a UV reflecting coating 5 in embodiments of this invention.

Still referring to FIG. 7, UV reflecting coating 5, which is also a low-E coating, may include optional dielectric layer 103 of or including silicon nitride, optional dielectric layer 105 of or including titanium oxide, lower contact/seed layer 107 of or including an oxide of zinc, IR reflecting layer 11 of or including silver, upper contact layer 111 of or including Ni and/or Cr, or an oxide thereof, optional dielectric layer 112 of or including titanium oxide, optional dielectric layer 113 of or including tin oxide, dielectric layer 114 of or including silicon nitride (or some other silicon-inclusive or other material), dielectric layer 115 of or including tin oxide, second lower contact/seed layer 117 of or including zinc oxide, second IR reflecting layer 11' of or including silver, second upper contact layer 121 of or including nickel and/or titanium or an oxide thereof, dielectric layer 123 of or including tin oxide, dielectric layer 124 of or including silicon nitride (or some other silicon-inclusive or other material), dielectric 126 of or including tin oxide, third lower contact/seed layer 127 of or including zinc oxide, third IR reflecting layer 11" of or including silver, third upper contact layer 131 of or including Ni and/or Ti or an oxide thereof, dielectric layer 132 of or including tin oxide, and dielectric layer 134 of or including silicon nitride and/or silicon oxynitride which may in certain example instances be a protective overcoat. Other layers and/or materials may also be provided in certain example embodiments of this invention, and it is also possible that certain layers may be removed or split in certain example instances. Further, in other example embodiments, one or more of upper contact layers 111, 121, and 131 may be of nickel chromium and/or an oxide thereof, rather than an oxide of nickel titanium. Moreover, any of contact layers 107, 111, 117, 121, 127, and/or 131 may be of or include nickel, titanium, chromium, zinc, combinations/alloys thereof, and may further include oxygen and/or nitrogen. Thus, any or all of upper contact layers 111, 121, and 131 may be Ni and/or Ti inclusive layers (e.g., layers comprising NiTiOx) in different embodiments of this invention. It is noted that certain example embodiments may replace the NiTiOx with Ti metal or TiOx.

Example Thicknesses

TABLE 1

Example Materials/Thicknesses; Fig. 7 Layers

| Layer | Preferred Range (Å) | Most Preferred (Å) | Ex. (Å) |
|---|---|---|---|
| Glass (1-10 mm thick) | | | |
| $Si_xN_y$ (layer 103) | 70-1200 Å | 200-350 Å | 294 Å |
| $TiO_x$ (layer 105) | 10-300 Å | 100-140 Å | 116 Å |

TABLE 1-continued

Example Materials/Thicknesses; Fig, 7 Layers

| Layer | Preferred Range (Å) | Most Preferred (Å) | Ex. (Å) |
|---|---|---|---|
| Glass (1-10 mm thick) | | | |
| $ZnO_x$ (layer 107) | 10-110 Å | 40-80 Å | 60 Å |
| Ag (layer 11) | 10-200 Å | 100-160 Å | 120 Å |
| $Ni_xTi_yO_z$ (layer 111) | 10-100 Å | 15-40 Å | 25 Å |
| $TiO_x$ (layer 112) | 10-150 Å | 40-60 Å | 50 Å |
| $SnO_x$ (layer 113) | 70-1200 Å | 200-700 Å | 270 Å |
| $Si_xN_y$ (layer 114) | 10-300 Å | 100-140 Å | 110 Å |
| $SnO_x$ (layer 115) | 70 to 1200 Å | 100-200 Å | 163 Å |
| $ZnO_x$ (layer 117) | 15-115 Å | 50-150 Å | 130 Å |
| Ag (layer 11') | 10-300 Å | 100-145 Å | 130 Å |
| NiTiOx (layer 121) | 10-150 Å | 20-50 Å | 25 Å |
| SnOx (layer 123) | 70-1200 Å | 300-700 Å | 501 Å |
| SixNy (layer 124) | 10-300 Å | 60-140 Å | 100 Å |
| SnOx (layer 126) | 10-300 Å | 100-200 Å | 150 Å |
| ZnOx (layer 127) | 10-110 Å | 40-80 Å | 60 Å |
| Ag (layer 11") | 10-300 Å | 120-180 Å | 161 Å |
| NiTiOx (layer 131) | 10-150 Å | 15-50 Å | 25 Å |
| SnOx (layer 132) | 10-300 Å | 100-210 Å | 155 Å |
| SixNy (layer 134) | 70-1200 Å | 200-300 Å | 256 Å |

In certain example embodiments, the top Ag-based layer 11" is the thickest silver based layer in the layer stack. This arrangement has been found to help improve (lower) emissivity of the coating. Also, in certain example embodiments, the middle Ag-based layer 11' is thinner than the top Ag-based layer 11", which has been found to help maintain the improved emissivity, while also itself improving off-axis color stability and helping to provide high visible transmission. Moreover, in certain example laminated embodiments, coated articles have been optionally heat treated to an extent sufficient for heat strengthening or tempering, and that have been coupled to another glass substrate to form an IG unit. It is noted that the FIG. 7 coating 5 is particularly well suited for use in an annealed product. Modifications may or may not be made for heat treatable (e.g., thermally temperable) embodiments. For example, in heat treatable example embodiments one or both of the layers 105 and/or 112 including TiOx may be removed. As another example, in the heat treatable coating, some or all of the layers 114, 124, and 134 comprising SiN may be made more metallic than in the annealed counterpart. Still further, some or all of the layers of NiTiOx may be replaced with layers of NiCr or an oxide thereof.

In view of the presence of IR blocking/reflecting coating (i.e., solar management coating) 5 which also functions as a UV reflecting coating, IG window units according to certain example embodiments of this invention as shown in FIGS. 1 and 4-5 may have the following solar characteristics (e.g., where the coated glass substrate 1 is a substantially transparent soda lime silica glass substrate from about 1-6 mm thick, more preferably from about 2 to 3.2 mm thick, and the other soda lime silica glass substrate 3 is substantially transparent and from about 1-6 mm thick, more preferably from about 2 to 3.2 mm thick). In Table 2 below, $R_gY$ is visible reflection from the outside or exterior of the window/building (i.e., from where the sun is located, and $R_fY$ is visible reflection from the interior side (e.g., from within the building interior).

TABLE 2

IG Unit Solar Characteristics

| Characteristic | General | Preferred | More Preferred |
|---|---|---|---|
| $T_{vis}$ (or TY)(Ill. C, 2 deg.): | >=40% | >=50% | >=60% |
| $R_gY$ (Ill. C, 2 deg.): | 5 to 17% | 7 to 13% | 9 to 11% |
| $R_fY$ (Ill. C, 2 deg.): | 5 to 20% | 7 to 14% | 10 to 12% |
| U-value: | 0.10 to 0.40 | 0.20 to 0.30 | 0.22 to 0.25 |

In certain example embodiments of this invention, there is provided an IG window unit comprising: a first glass substrate; a second glass substrate spaced apart from the first glass substrate, wherein the first glass substrate is adapted to be located farther from a building interior than is the second glass substrate; an ultraviolet (UV) absorbing coating provided in a pattern and located on an interior surface of the first glass substrate so that the UV absorbing coating is located between at least the first and second glass substrates; a UV reflecting coating located on the interior surface of the first glass substrate, so that the UV absorbing coating is located between at least the first glass substrate and the UV reflecting coating, wherein the UV reflecting coating reflects at least about 5% more UV radiation than does the UV absorbing coating in at least a majority of a range of from 360-390 nm.

In the IG window unit of the immediately preceding paragraph, the IG window unit may have a visible transmission of at least about 40%, more preferably of at least about 50%.

In the IG window unit of any of the preceding two paragraphs, the UV absorbing coating may comprise frit.

In the IG window unit of any of the preceding three paragraphs, the UV reflecting coating may comprise or consist essentially of a low-E coating including at least one layer comprising silver, or alternatively the UV reflecting coating may consist essentially of a layer of or including titanium oxide.

In the IG window unit of any of the preceding four paragraphs, the UV reflecting coating may comprise or consist essentially of a low-E coating including at least two layers comprising silver.

In the IG window unit of any of the preceding five paragraphs, the UV reflecting coating may comprise or consist essentially of a low-E coating including at least three layers comprising silver.

In the IG window unit of any of the preceding six paragraphs, the UV reflecting coating may be a low-E coating having a sheet resistance of no greater than 10 ohms/square, more preferably no greater than 8 ohms/square, and most preferably no greater than 6 ohms/square.

In the IG window unit of any of the preceding seven paragraphs, the UV reflecting coating may directly contact the UV absorbing coating.

In the IG window unit of any of the preceding eight paragraphs, the UV reflecting coating may be substantially transparent to visible light.

In the IG window unit of any of the preceding nine paragraphs, the UV absorbing coating may be substantially transparent to visible light.

In the IG window unit of any of the preceding ten paragraphs, the pattern may be a grid pattern.

In the IG window unit of any of the preceding eleven paragraphs, the UV reflecting coating may be provided across substantially the entire viewing area of the window whereas the UV absorbing pattern may be provided in the pattern so as to be provided in less than about half of the viewing area of the window.

In the IG window unit of any of the preceding twelve paragraphs, a glass side (outside) reflectance curve of the UV reflecting coating may have a hump in a UV range compared to a visible range of 440-680 nm, so that the UV reflecting coating may have a higher glass side reflectance in the UV range than in the visible range.

In the IG window unit of any of the preceding thirteen paragraphs, the UV reflecting coating may reflect at least 20% of UV radiation in a majority of the range of from 360-390 nm.

In the IG window unit of any of the preceding fourteen paragraphs, the UV reflecting coating may reflects at least 30% of UV radiation in a majority of the range of from 360-390 nm.

In the IG window unit of any of the preceding fifteen paragraphs, the UV reflecting coating may comprise first and second substantially transparent layers comprising silver, and at least one dielectric layer provided between the first and second layers comprising silver.

In the IG window unit of any of the preceding sixteen paragraphs, the space between the substrates may be filled with a gas and/or may be evacuated to a pressure less than atmospheric.

In the IG window unit of any of the preceding seventeen paragraphs, the UV absorbing coating may consists essentially of a single layer.

It is noted that certain parameters can be tuned by adjusting layer thicknesses. For example, sheet resistance can be decreased and visible transmission decreased by increasing the thickness of the silver based layer(s) 11 and/or by providing the coating with additional silver based layer(s) such as 11' and 11". In certain example embodiments, the coating 5 may have a sheet resistance ($R_s$) of no greater than 10 ohms/square, more preferably no greater than 8 ohms/square, and most preferably no greater than 6 ohms/square.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An IG window unit comprising:
a first glass substrate;
a second glass substrate spaced apart from the first glass substrate with a gap provided therebetween, wherein the first glass substrate is adapted to be located farther from a building interior than is the second glass substrate;
an ultraviolet (UV) absorbing coating provided in a pattern and located on an interior surface of the first glass substrate so that the UV absorbing coating is located between at least the first and second glass substrates;
a UV reflecting coating located on the interior surface of the first glass substrate, so that the UV absorbing coating is located between at least the first glass substrate and the UV reflecting coating, wherein the UV reflecting coating reflects at least 5% more incident UV radiation than does the UV absorbing coating in at least a majority of a range of from 360-390 nm;
wherein the UV absorbing coating and the UV reflecting coating are each provided on the interior surface of the first glass substrate, so that the gap is located between the second glass substrate and the UV reflecting coating.

2. The IG window unit of claim 1, wherein the IG window unit has a visible transmission of at least 40%.

3. The IG window unit of claim 1, wherein the IG window unit has a visible transmission of at least 50%.

4. The IG window unit of claim 1, wherein the UV absorbing coating comprises frit.

5. The IG window unit of claim 1, wherein the UV reflecting coating comprises a low-E coating including at least one layer comprising silver.

6. The IG window unit of claim 1, wherein the UV reflecting coating comprises a low-E coating including at least two layers comprising silver.

7. The IG window unit of claim 1, wherein the UV reflecting coating comprises a low-E coating including at least three layers comprising silver.

8. The IG window unit of claim 1, wherein the UV reflecting coating comprises a low-E coating having a sheet resistance of no greater than 8 ohms/square.

9. The IG window unit of claim 1, wherein the UV reflecting coating directly contacts the UV absorbing coating.

10. The IG window unit of claim 1, wherein the UV reflecting coating consists essentially of titanium oxide.

11. The IG window unit of claim 1, wherein the UV reflecting coating is transmissive of at least 40% of visible light.

12. The IG window unit of claim 1, wherein the UV reflecting coating comprises a low-E coating having a sheet resistance of no greater than 8 ohms/square,
wherein the UV reflecting coating reflects at least 20% of UV radiation in a majority of the range of from 360-390 nm, and
wherein a glass side (outside) reflectance curve of the UV reflecting coating has a hump in a UV range compared to a visible range of 440-680 nm, so that the UV reflecting coating has a higher glass side reflectance in the UV range than in the visible range.

13. The IG window unit of claim 1, wherein the pattern comprises a grid pattern.

14. The IG window unit of claim 1, wherein the UV reflecting coating is provided across a majority of the entire viewing area of the window whereas the UV absorbing pattern is provided in the pattern so as to be provided in less than half of the viewing area of the window.

15. The IG window unit of claim 1, wherein a glass side (outside) reflectance curve of the UV reflecting coating has a hump in a UV range compared to a visible range of 440-680 nm, so that the UV reflecting coating has a higher glass side reflectance in the UV range than in the visible range.

16. The IG window unit of claim 1, wherein the UV reflecting coating reflects at least 20% of UV radiation in a majority of the range of from 360-390 nm.

17. The IG window unit of claim 1, wherein the UV reflecting coating reflects at least 30% of UV radiation in a majority of the range of from 360-390 nm.

18. The IG window unit of claim 1, wherein the UV reflecting coating comprises first and second infrared (IR) reflecting layers comprising silver, and at least one dielectric layer provided between the first and second layers comprising silver.

19. The IG window unit of claim 1, wherein the space between the substrates is filled with a gas and/or is evacuated to a pressure less than atmospheric.

20. The IG window unit of claim 1, wherein the UV absorbing coating contains only a single layer.

21. A window unit comprising:
a glass substrate;
an ultraviolet (UV) absorbing coating provided in a pattern and located on the glass substrate;
a UV reflecting coating located on the glass substrate so as to directly contact the UV absorbing coating, so that the UV absorbing coating is to be located closer to an exterior of a building in which the window is to be installed than is the UV reflecting coating, wherein the UV reflecting coating is transmissive of at least 40% of visible light and reflects at least 20% of UV radiation in a majority of a range of from 360-390 nm.

22. The IG window unit of claim 1, wherein the UV reflecting coating reflects at least 10% more UV radiation than does the UV absorbing coating in at least a majority of a range of from 360-390 nm.

23. The IG window unit of claim 1, wherein the UV reflecting coating reflects at least 15% more UV radiation than does the UV absorbing coating in at least a majority of a range of from 360-390 nm.

\* \* \* \* \*